United States Patent [19]
Dottling et al.

[11] Patent Number: 6,014,756
[45] Date of Patent: Jan. 11, 2000

[54] HIGH AVAILABILITY ERROR SELF-RECOVERING SHARED CACHE FOR MULTIPROCESSOR SYSTEMS

[75] Inventors: Gerhard Dottling, Dettenhausen; Klaus-Jörg Getzlaff, Schönaich; Bernd Leppla, Ehningen; Wille Udo, Holzgerlingen, all of Germany

[73] Assignee: International Business Machines Corporation, Armonk, N.Y.

[21] Appl. No.: 08/765,010
[22] PCT Filed: Aug. 18, 1995
[86] PCT No.: PCT/EP95/01453
  § 371 Date: Dec. 16, 1996
  § 102(e) Date: Dec. 16, 1996
[87] PCT Pub. No.: WO96/33459
  PCT Pub. Date: Oct. 24, 1996
[51] Int. Cl.[7] ........................................... G06F 11/00
[52] U.S. Cl. .................. 714/15; 714/6; 714/48; 711/130; 711/142; 711/150
[58] Field of Search ................. 395/182.13, 182.04, 395/185.01; 711/141, 147, 118, 101, 130, 131, 149, 142, 150; 714/15, 6, 48

[56] References Cited

U.S. PATENT DOCUMENTS 5,276,848  1/1994  Gallagher et al. ................... 395/425
5,584,013  12/1996  Cheong et al. ...................... 395/449
5,680,577  10/1997  Aden et al. .......................... 395/477
5,740,353  4/1998  Kreulen et al. ................... 395/183.18

*Primary Examiner*—Norman Michael Wright
*Attorney, Agent, or Firm*—Marc A. Ehrlich

[57] ABSTRACT

A high availability shared cache memory in a tightly coupled multiprocessor system provides an error self-recovery mechanism for errors in the associated cache directory or the shared cache itself. After an error in a congruence class of the cache is indicated by an error status register, self-recovery is accomplished by invalidating all the entries in the shared cache directory means of the accessed congruence class by resetting Valid bits to "0" and by setting the Parity bit to a correct value, wherein the request for data to the main memory is not cancelled.

Multiple bit failures in the cached data are recovered by setting the Valid bit in the matching column to "0". The processor reissues the request for data, which is loaded into the processor's private cache and the shared cache as well. Further requests to this data by other processors are served by the shared cache.

12 Claims, 3 Drawing Sheets

LINEFETCH REQUEST SERVED BY SHARED CACHE

PU LINEFETCH REQUEST
   TO SHARED CACHE
   TO MEMORY
CANCEL MEMORY REQUEST
SEARCH SHARED CACHE
SHARED CACHE DIR MATCH
SHARED CACHE DATA TO PU

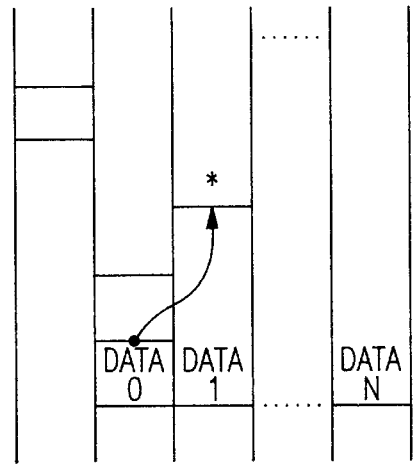

FIG.3

LINEFETCH REQUEST WITH PARITY ERROR
IN SHARED CACHE DIRECTORY OR LRU

PU LINEFETCH REQUEST
   TO SHARED CACHE
   TO MEMORY
CANCEL MEMORY REQUEST
SEARCH SHARED CACHE
SHARED CACHE DIR/LRU PCHK
SHARED CACHE DATA TO PU

MEMORY DATA TO PU
UPDATE SHARED CACHE
UPDATE SHARED CACHE DIR

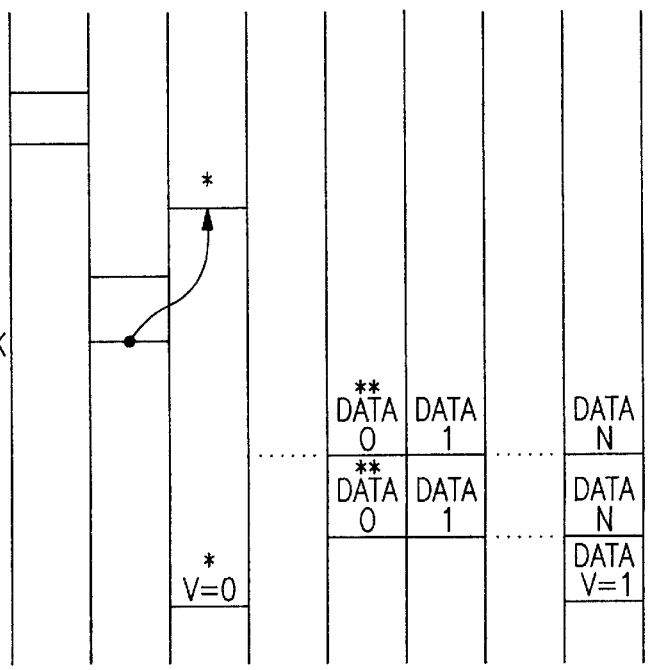

FIG.4

HIGH AVAILABILITY ERROR SELF-RECOVERING SHARED CACHE FOR MULTIPROCESSOR SYSTEMS

TECHNICAL FIELD OF THE INVENTION

BACKGROUND OF THE INVENTION

The invention relates to a high availability shared cache memory in a tightly coupled multiprocessor system and, in particular, to an error self-recovery mechanism for a shared cache.

The use of shared cache memory buffers in computer systems with multiple tightly coupled processing units is known in the prior art. An exemplary approach of such a computer system is shown in FIG. 1. Herein a number of processing units P1–Pn, a shared cache memory and a main memory are interconnected by a common system bus. The processing units may further comprise so-call ed second level cache memories which are associated to the processing units. Arbitration of the main memory is accomplished by an arbiter. The shared cache is managed by means of a set associative cache directory.

A corresponding shared memory cache for the use in a multiple processor system is disclosed in EP-A-392 184. An improvement of the system's performance by means of this cache memory is achieved by:

1. A reduction of the memory access time for the shared memory;
2. a reduction of latency of a shared memory reference which has to be routed via the multiple processor interconnection network;
3. an increase of the throughput of the multiple processor interconnection network by reducing the memory access time;
4. avoidance of the need for cache coherence among the shared memory caches.

Further EP-A-0 637 799 is directed to a high performance shared cache for multiprocessor systems, which supports the multiprocessor system insofar as allowing maximum parallelism in accessing the cache by the processing units, servicing one processor request in each machine cycle, reducing system response time, and increasing system throughput. The shared cache disclosed therein, uses the additional performance optimization techniques of pipelining cache operations, i.e. loads and stores, and burst-mode data accesses. By including built-in pipeline stages, that cache is enabled to service one request every machine cycle from any processing element. This contributes to reduction in the system response time as well as the throughput. Particulary one portion of the data is held by means of a logic circuitry of the cache, while another portion, corresponding to the system bus width, gets transferred to the requesting element, e.g. a processor or a storage, in one cycle. The held portion of the data can then be transferred in the following machine cycle.

Further, EP-A-0 348 628 concerns a multiprocessor system design comprising a level one cache in each processor, a shared level two cache memory, shared by each processor, and one main memory, called a level three storage. The level two cache is serial in nature. Herethrough processor requests can be partitioned into request sources, the L2 cache request priority algorithm, and status information used to control the request sources. When data is updated in the L2 cache, the other L1 caches must not see the modified data until their copies are invalidated. Hereby, storage consistency of data is accomplished.

A concept to maintain data consistency is known from an article entitled "Data Consistency in a Multi-processor System with Store-In Cache concept", Microprocessing and Microprogramming 32 (1991) 215–220, North-Holland, by G. Doettling. This article addresses the problems of maintaining data consistency in a multiprocessor system with an embedded cache on each processor. Common system resources are used to achieve data integrity under any circumstances. In particular, the so-called MESI protocol for use in multiprocessor cache structures is disclosed therein, which provides among others a Valid bit and a Multiple Copy bit for indicating the states of lines stored in the cache.

Therefore shared cache memories provide significant performance improvement for accesses to data, which is shared among the attached processing units, since those accesses do not comprise memory latency and since the shared cache provides shared data immediately.

If, for example, a processing unit requests a line which is not available in its private L2 cache, then this "request for a missing line" is routed to the shared cache and to the main memory in parallel. If the shared cache can provide the requested data, the request to the main memory will be cancelled. The main memory provides the data only in those cases where no match is found in the shared cache directory. Data which is provided by the main memory is loaded into the shared cache and the private cache as well. Any further accesses to this cache line by any other processing unit are then served by the shared cache again to improve the performance of the overall system as above described.

The performance of those systems can be further improved by extending the size of the shared cache, but hereby the importance of data errors will also increase. It is therefore an object of the present invention to provide a shared cache in a multiple processor system with an improved availability, which is crucial for the system performance and for the total system availability.

SUMMARY OF THE INVENTION

The object of the invention is solved by an improved design of a shared cache memory which provides high availability due to an error self-recovery mechanism, these features being set forth in the independent claims.

The inclusion of this shared cache, which can be a Store-Through cache, improves the system's performance, but does not degrade the system reliability at all. This is achieved by the proposed error self-recovery scheme for a shared cache, which recovers from intermittend failures in the management unit and from soft bit failures in the cached data, themselves.

Moreover, there is no loss of customer data and the system's performance is not impacted at all, since no error diagnostic code and no error recovery code is required.

The proposed self-recovery mechanism can be extended to recover from hard errors in the cache directory with some diagnostic code support, however there is no customer data loss and neglectable performance degradation.

In a system without the proposed error-recovery scheme all kinds of errors in its management unit and in the cached data cause catastrophic system errors, which require extensive diagnostic and recovery code. But with the present invention the shared cache can recover from intermittent failures in its management unit and in the cached data by itself without indicating a system problem to the user and even more important, without any loss of data.

In the following preferred embodiments of the invention are described in more detail with reference to the drawing in which

BRIEF DESCRIPTION OF THE DRAWINGS

FIGS. 3–5 are timing charts illustrating a linefetch request served by the shared cache, a linefetch request with a parity error in the shared cache directory, and a linefetch request with an uncorrectable error in shared cache data.

DETAILED DESCRIPTION OF THE PREFERRED EMBODIMENTS

Self-recovery from errors in the management unit of the shared cache

Figure 1:
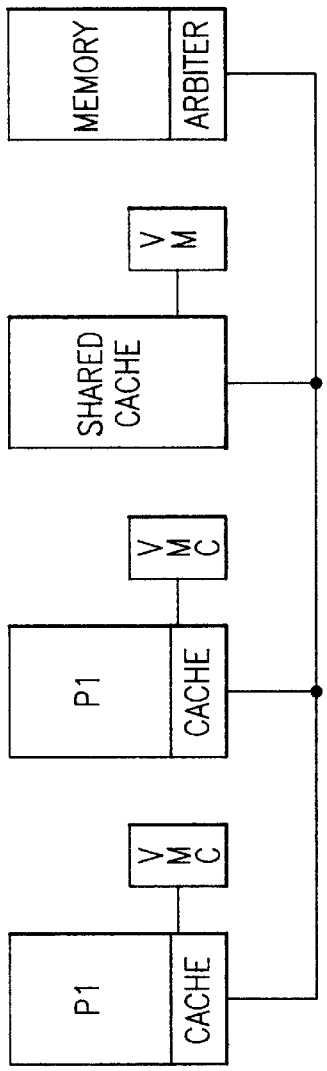
FIG. 1 is a schematic representation of a prior art multiple processor system with a shared cache.
Figure 2:
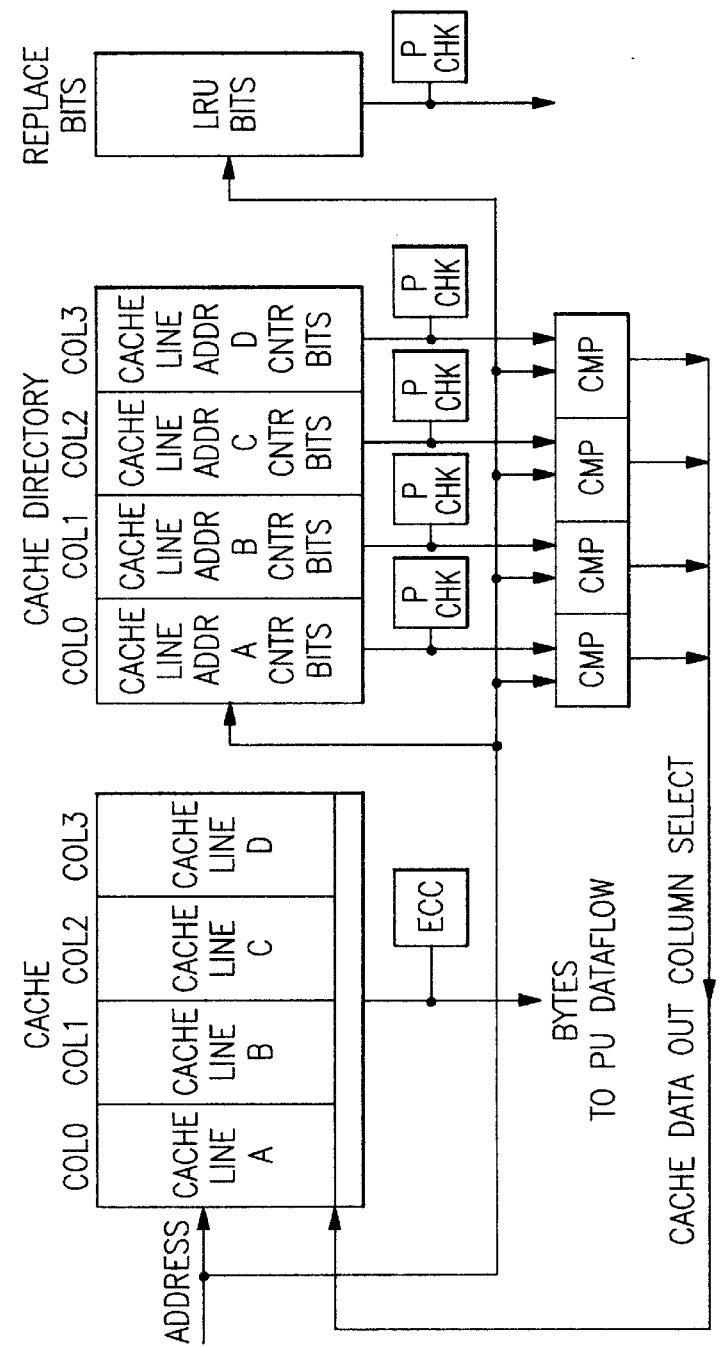
FIG. 2 is a block diagram showing the shared cache organization and dataflow according to the invention.

The shared cache memory shown in FIG. 2 is 4-way associative and comprises columns COL0–COL3 representing different cache lines A–D. It is noted that the present invention is not bound to the number of columns of the shared cache, i.e. the shared cache can be n-way associative with n=8, 16, etc. The horizontal rows of this cache define so-called congruence classes or address classes, respectively, for the cached data. The data read out to be utilized by a processor, pass an error correction facility (ECC) at the bottom of the shared cache memory, which corrects single bit errors and detects multiple bit errors (uncorrectable errors in data). The shared cache is managed by a set associative cache directory which applies a least recently used (LRU) algorithm to the stored data. This algorithm defines the shared cache entry which has to be replaced in case all entries are occupied within a congruence class.

The status of each line is recorded in the cache directory by a Valid bit (V) and by a Multiple Copy bit (MC). The Valid bit, if set to "1", indicates that the corresponding cache line contains actual, i.e. valid data. The MC bit, if set to "1", indicates that the corresponding cache line is shared among a plurality of at least two processors. A Change bit is not implemented since the private caches associated to the processors keep track of data integrity of changed lines.

The cache directory of the shared cache provides a Parity bit for each entry of the directory. The parity bit is examined for correct parity with each search access in all entries of a congruence class in parallel.

In case there is a parity error detected in any entry of a congruence class in a cycle, where the cache directory is searched, the following error self-recovery mechanism is invoked, regardless whether there is a match found or not, since it can not be relied on it in an error case:

1. The shared cache records an error event in an error status register.
2. All entries in the cache directory of the accessed congruence class are invalidated by resetting the V bits to "0" and by setting the parity bit to a correct value.
3. The request for data, which is delivered by a requesting processor to the main memory, is not cancelled. Therefore the main memory will provide the requested data.
4. The data provided by the main memory is loaded into the shared cache as well as into the private cache of the processor.
5. After the requested data is received by the processor and the shared cache, both validate this line in their cache directory by setting the Valid bit to "1".
6. Further accesses to this data by another processor will be served by the shared cache, if the parity error was caused by some kind of intermittent failure.

The same mechanism applies if a parity error is found in the LRU bits of the searched congruence class or if more than one congruence class indicates a match, caused by failures which affect more than one column.

To circumvent hard failures in the cache directory of the management unit, the error status information has to contain the line address and the congruence class of the error. This information must be read by a diagnostic code periodically, e.g. when the requesting processor is in an idling state. If there is an error found with the same line address and in the same congruence class frequently, then this information can be used to remove the corresponding cache directory entry. Hereby a Delete bit is required per cache directory entry in a separate array. If the Delete bit is set, the corresponding cache directory entry will be invalidated and not used anymore.

Thus, with the proposed scheme, intermittent errors in the cache directory can be recovered without any Diagnostic Code, which improves the system's availability and reliability, since it continues to operate without any loss of data and without performance impact. Hard errors in the cache directory can be circumvented by a Delete bit per cache line, which effects an invalidation of such a line.

Self-recovery from errors in data bits of the shared cache

One of the problems of large caches are soft bit failures due to e.g. cosmic radiation. To recover from such erroneous states, prior art shared cache memories implement a single bit error correction and a double bit error detection scheme (uncorrectable error). Though the correction of single bit errors does not impact the system, double bit errors require intensive diagnostic code support and thereby impact the system performance and availability.

The proposed self-recovery scheme avoids this disadvantage also in case of double bit errors.

1. The shared cache records an error event in an error status register.
2. The erroneous line is invalidated by setting the corresponding V bit in the cache directory to "0".
3. The shared cache informs the requesting processor that the requested data can not be provided.
4. The processor issues the request for data again.
5. The request is served by the main memory, since the shared cache has turned off its V bit.
6. The data provided by the main memory is loaded into the shared cache as well as into the private second level cache of the processor.
7. After the requested data is received by the processor and the shared cache, both validate this line in their cache directory by setting the corresponding V bit to "1".
8. Further accesses by any other processor to this reloaded data in the shared cache will not fail, if the uncorrectable error was caused by an intermittent problem.

This self-recovery mechanism does not degrade system performance, since no diagnostic code must be executed to recover from uncorrectable bit failures in the shared cache. Moreover, this error recovery from uncorrectable errors works without loss of any customer'data, which is a key to achieve a very reliable system.

In FIG. 3, a linefetch request which is served by a shared cache according to the invention, is illustrated by means of a timing chart. In the first cycle one of the processing units attached to the shared cache via a system bus delivers a request for a line and sends this request to the shared cache as well as to the main memory. Hereby it is assumed that this line is already available in the shared cache, so that the search being performed in the shared cache directory yields a match. Thus the linefetch request can be served by the shared cache and at the same cycle a first block of the requested data is provided on the system bus. In the following cycle, the memory request for data is cancelled due to the match in the shared cache directory (FIG. 3 "*").

In FIG. 4 the functionality of the shared cache is illustrated by another example, where a linefetch request with a parity error in the shared cache directory or the LRU logic occurs. In the first cycle a linefetch request is sent to the shared cache and to the main memory. The requested line is found in the cache directory, but a parity error is detected in the addressed congruence class. Therefore, in the next cycle the memory request for data is not cancelled ("*" and dotted line in FIG. 4) due to the parity error in the shared cache directory or the LRU. Instead of cancelling, at the same cycle all cache directory entries in the addressed congruence class are invalidated by setting the corresponding Valid bits to "0". Some cycles later the main memory serves the linefetch request by the processing unit (FIG. 4 "***"), wherein data blocks "0"–"N" are loaded in parallel into the shared cache and the private cache associated with the requesting processing unit. In the cycle where the last block "N" of data has been transferred to the shared cache, this line is validated in the shared cache by setting the Valid bit to "1" in the corresponding entry of the shared cache directory.

Figure 5:
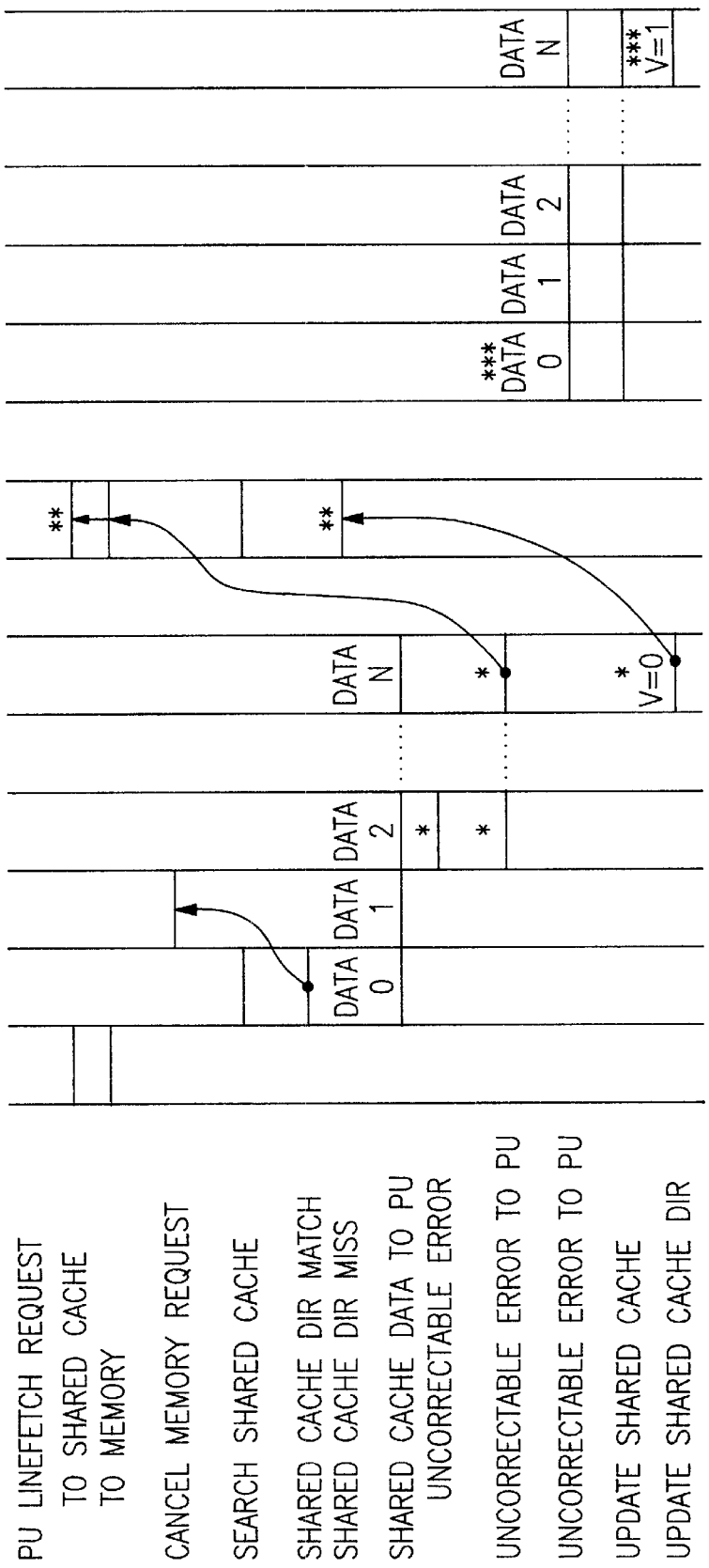

As another example, a linefetch request with an uncorrectable error in the shared cache data is shown in FIG. 5. It is assumed that data transfer has been initiated according to FIG. 3. For one of the data blocks "1"–"N", e.g. data block "2", an uncorrectable error is detected, which is signalled to the processing unit (FIG. 5 "*"). The shared cache resets the corresponding Valid bit to "0" (invalidate) in its directory.

Due to the uncorrectable error indicated by an "Uncorrectable Error To PU" signal, the processor reissues its linefetch request for data again, which is not served by the main memory, since the shared cache invalidated its copy of the data previously (FIG. 5 "***"). The shared cache detects "Miss In Directory", due to invalidate.

The main memory serves the processor's Linefetch Request (FIG. 5 "****"). As blocks of data D0 . . . DN are transferred from the main memory to the requesting processor, the shared cache is loaded in parallel. When the last data block DN is received, the shared cache validates its copy of the data by setting the corresponding Valid bit to "1".

With this scheme the shared cache has both, refreshed its copy of the data and eliminated the uncorrectable error, if this failure was caused by an intermittent problem, like cosmic radiation.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the present invention, as defined in the following claims.

We claim:

1. A high availability shared cache in a multiprocessor system having at least two processing units, for storing information as congruence classes to be utilized by the processing units, wherein the multiprocessor system comprises:

cache means associated with each of said processing units for storing information to be utilized by the processing units;

main memory means for storing information to be utilized by the processing units, which are managed by arbitration means;

bus means for transferring information between the processing units, the shared cache, and the main memory means;

shared cache directory means for managing the shared cache, comprising entries of all the information stored in the shared cache, a Valid bit for the status of the information stored in the shared cache, and a Parity bit for indicating errors in the shared cache; and error status register means for recording error events, which are provided by the shared cache;

wherein a request for information is transmitted to the shared cache and the main memory means, in parallel, and in case of the error status register means recording an error in any entry of a congruence class in the shared cache directory means, self-recovery of the shared cache is accomplished by invalidating all the entries in the shared cache directory means of the accessed congruence class by resetting the Valid bits to "0" and by setting the Parity bit to a correct value; and the request for information to the main memory means is not cancelled.

2. The shared cache according to claim 1, wherein the cache means associated with each processing unit provide a Valid bit, a Multiple Copy bit and a Change bit, and the shared cache directory means further provides a Multiple Copy bit, for the status of the information stored therein.

3. The shared cache according to claim 1, wherein information provided by the main memory means is loaded into the shared cache and the cache means, which are associated with the processing units, in parallel.

4. The shared cache according to claim 3, wherein after the requested information is received by the requesting processing unit and the shared cache, both validate the corresponding entry in their cache directories by setting the Valid bits to "1".

5. The shared cache according to claim 1, wherein if for more than one congruence class an error is indicated, the corresponding Valid bits in the shared cache directory means are set to "0".

6. The shared cache according to claim 1, wherein in case of a frequently found erroneous entry, the corresponding entry of the shared cache directory means is cancelled by setting a Delete bit.

7. A high availability shared cache in a multiprocessor system having at least two processing units, for storing information, to be utilized by the processing units, as congruence classes, wherein the multiprocessor system comprises:

cache means associated with each of said processing units for storing information to be utilized by the processing units;

main memory means for storing information to be utilized by the processing units, which are managed by arbitration means;

bus means for transferring information between the processing units, the shared cache, and the main memory means;

shared cache directory means for managing the shared cache, comprising entries of all the information stored in the shared cache, a Valid bit for the status of the information stored in the shared cache, and a Parity bit for indicating errors in the shared cache; and error status register means for recording error events, which are provided by the shared cache;

wherein a request for information is transmitted to the shared cache and the main memory means, in parallel, and in case of multiple bit failures in the shared cache as indicated by an error correction facility, self-recovery of the shared cache is accomplished by invalidating matching entries in the shared cache directory means of the corresponding congruence class by resetting the Valid bits to "0" and by informing the requesting processing unit that the information can not be provided, whereby the processing unit issues the request for information again and the request is served by the main memory means.

8. The shared cache according to claim 7, wherein the cache means associated with each processing unit provide a Valid bit, a Multiple Copy bit and a Change bit, and the shared cache directory means further provides a Multiple Copy bit, for the status of the information stored therein.

9. The shared cache according to claim 7, wherein information provided by the main memory means is loaded into the shared cache and the cache means, which are associated with the processing units, in parallel.

10. The shared cache according to claim 7, wherein after the requested information is received by the requesting unit and the shared cache, both validate the corresponding entry in their cache directories by setting the Valid bits to "1".

11. A multiprocessor computer system comprising a high availability shared cache memory with an error self-recovery mechanism according to claim 1.

12. A multiprocessor computer system comprising a high availability shared cache memory with an error self-recovery mechanism according to claim 7.

* * * * *